Dec. 4, 1956 T. B. CHACE 2,772,833
FLUID MIXING DEVICE
Filed Sept. 28, 1951 2 Sheets-Sheet 1

Inventor:
Thomas B. Chace
by Hill, Sherman, Meroni, Gross & Simpson Attys

Dec. 4, 1956     T. B. CHACE     2,772,833
FLUID MIXING DEVICE
Filed Sept. 28, 1951          2 Sheets-Sheet 2
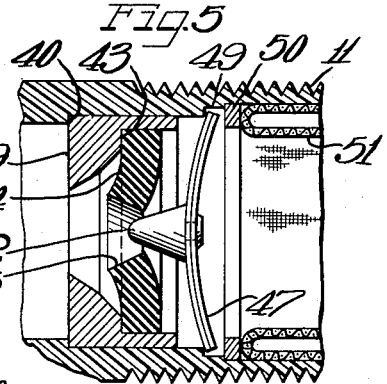
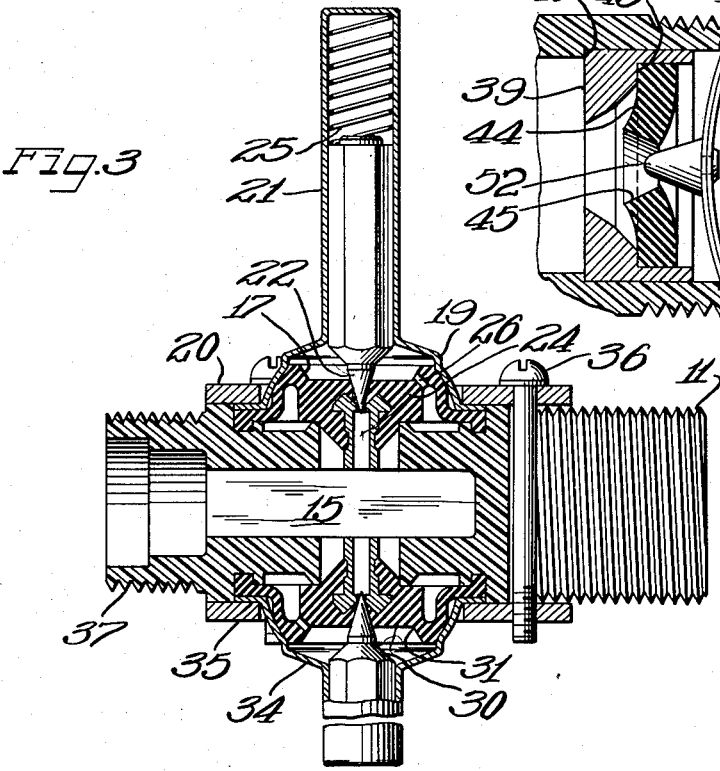
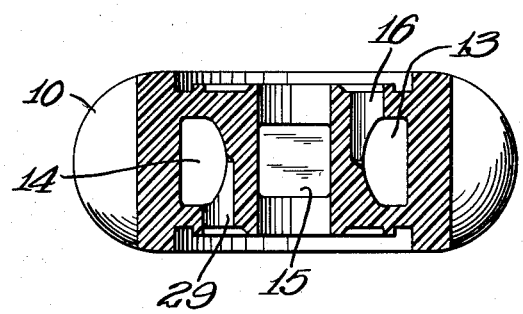
Inventor:
Thomas B. Chace
by Hill, Sherman, Meroni, Gross & Simpson
Attys

United States Patent Office 2,772,833
Patented Dec. 4, 1956

2,772,833

FLUID MIXING DEVICE

Thomas B. Chace, Winnetka, Ill., assignor to The Dole Valve Company, Chicago, Ill., a corporation of Illinois Application September 28, 1951, Serial No. 248,829

11 Claims. (Cl. 236—12)

This invention relates to improvements in fluid mixing valves and more particularly relates to an improved form of valve particularly adapted to deliver either hot or cold water or water at an intermediate constant temperature to automatic washing machines.

A principal object of my invention is to provide a new and improved mixing valve of the class described, so arranged as to maintain the proportion of the hot and cold water delivered substantially constant both in regard to temperature and volume.

Another object of my invention is to provide a flow adjusting device adjustable upon variations in pressure and temperature of the inlet fluid.

A further object of my invention is to provide a novel and improved form of mixing valve delivering a predetermined constant rate of flow of hot and cold water for mixing purposes regardless of pressure variations and to vary this rate of flow in accordance with the temperature needs to maintain the temperature of the delivered water uniform, regardless of variations in temperature of the hot and cold water at their sources.

Another object of my invention is to provide a novel mixing and fluid control unit for hot and cold water having a pair of shut-off valves for the hot and cold water and constant flow maintaining device associated with the inlet of each valve, automatically variable in accordance with variations in temperature of the inlet water.

A further and more detailed object of my invention is to provide a novel and improved mixing valve including separate delivery valves for the hot and cold water, controlling the mixing and delivery of the water, and pressure and temperature controlled flow control means for maintaining the rate of flow to the delivery valves substantially constant regardless of variations in pressure of the water entering the valve and varying the relationship of hot and cold water flow in relation to the hot and cold water inlet temperature so as to maintain the temperature of the mixed water at a constant value.

A further object of my invention is to provide a novel and improved form of mixing valve for delivering water at predetermined temperatures, governed by the flow rate of the water entering the valve.

Still another object of my invention is to provide a novel form of flow control means controlling the flow of fluid through a pipe, maintaining the flow rate of the delivered water at the rate to which it is adjusted regardless of increases or decreases in pressure, and varying this flow rate in accordance with the temperature of the fluid flowing through the pipe.

A still further object of my invention is to provide a novel and improved form of mixing valve, including selectively operable hot and cold water shut-off valves and pressure responsive flow controls maintaining the flow rate to the valves substantially constant, regardless of variations in pressure.

Still another object of my invention is to provide a flow adjusting device for adjusting the flow of fluid through a conduit as the inlet pressure and temperature varies, including a resilient deformable flow control annulus arranged to restrict the flow of fluid upon increases in pressure, and a cooperating thermostatically controlled valve element adjusting the flow rate setting in accordance with the temperature of the inlet water.

These and other objects of my invention will appear from time to time as the following specification proceeds and with reference to the accompanying drawings, wherein:

Figure 3 is a longitudinal sectional view taken through the valve shown in Figure 1 with the operating solenoid coils removed;

Figure 4 is a transverse sectional view taken through the valve body and looking toward the outlet end thereof; and Figure 5 is an enlarged detailed fragmentary sectional view taken longitudinally along one of the valve inlets and showing the temperature and pressure sensitive flow control means in a different operative position than in Figure 2.

Figure 1:
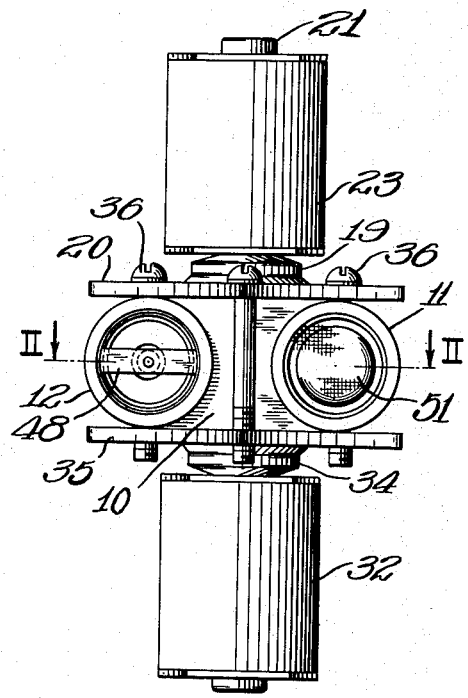
Figure 1 is an end view of a mixing valve constructed in accordance with my invention looking toward the inlets of the valve and showing one of the inlet screens removed in order to illustrate certain details of the temperature sensitive flow adjusting means therefor.

In the embodiment of my invention illustrated in the drawings, the valve shown comprises a valve body 10 of an integral construction, although it need not be of such construction, having hot and cold water inlets 11 and 12 leading thereinto and communicating with passageways 13 and 14 extending along opposite sides of a central mixing chamber 15.

The valve body 10 and the control valves controlling the mixing of the hot and cold water in the mixing chamber 15 are shown as being of the same general construction as disclosed in an application, Serial No. 229,983, filed by James K. Lund on June 5, 1951, now Patent No. 2,712,324, dated July 5, 1955., although they need not be of such a construction and may be of any well known form.

The passageway 13 for the hot water communicates with a passageway 16 extending at right angles with respect thereto and shown in Figure 4 as leading upwardly to an open end face of the valve body closed by a flow control or shut-off valve 17 and a closure cap 19 therefor. The shut-off valve 17 is herein shown as being a pressure-operated diaphragm valve like that as shown and described in the aforementioned Patent No. 2,712,324. The diaphragm valve 17 is seated at its periphery in the top face of the valve body and is held thereto in sealing relation with respect to the end of the valve body by means of a cap 19 held in engagement with the outer face of said diaphragm valve by a yoke 20. The cap 19 terminates into a centrally disposed elongated guide 21 for a pilot valve 22, herein shown as being the armature of a solenoid 23 and closing a central passageway 24 through the diaphragm valve 17 by the bias of a spring 25. An aperture 26 leads from one face of the diaphragm valve 17 to the other, and when the central opening 24 through the valve 17 is closed by the pilot 22, the pressure on the top of the diaphragm valve 17 will be greater than that on the underside thereof to close and maintain said valve closed. When the pilot valve 22 is moved out of engagement with the central opening 24, the pressure on the outer side of the diaphragm valve is relieved, and pressure of the fluid on the inside of said diaphragm entering through the passageway 16 will open the valve and allow the hot water to pass into the mixing chamber 15.

In like manner, a passageway 29 is shown as leading from the cold water passageway 14 at right angles thereto to the opposite end face of the valve. Said end face is closed by a diaphragm valve 30 and cap piece 34, held in engagement with the end of the valve by a yoke 35. The yokes 20 and 35 are connected together and are maintained in engagement with the opposite end faces of the valve body by machine screws 36 extending through the yoke 20 and shown as being threaded in the yoke 35. The valve 30 is controlled by means of a pilot valve 31, shown as being the armature of a solenoid 32.

Figure 2:
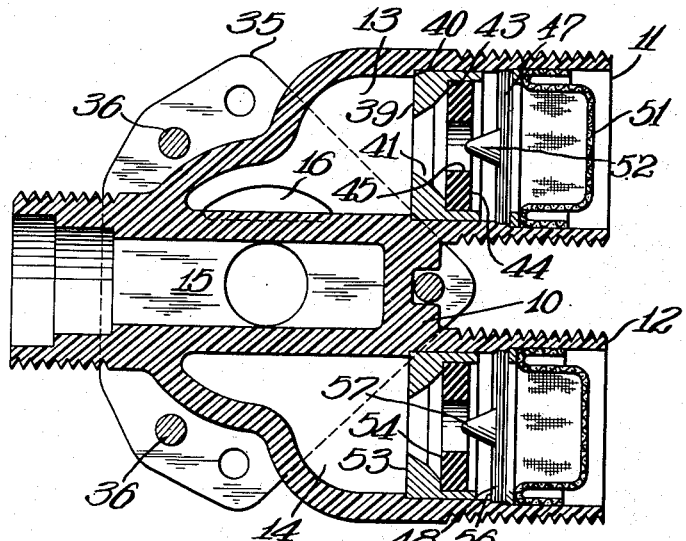
Figure 2 is a horizontal sectional view taken substantially along line II—II of Figure 1.

Referring now to Figures 1, 2 and 5 and the novel flow control of my invention, arranged to maintain the flow rate of hot and cold water into the valve body at the rate to which the flow control is set, regardless of variations in pressure of the incoming water, and also to adjust the flow rate setting in accordance with the temperature of the inlet water, an annular seating member 39 is seated in the inlet 11 and abuts an inner shouldered portion 40 thereof. The seat 39 has a central opening therethrough in the form of two frusto-conical surfaces, one of said conical surfaces being at the downstream side of said seat and being at a steeper angle than the other of said conical surfaces and at the upstream side of said seat. The conical surface on the upstream side of the seat 39 terminates into a flat shoulder 43, forming a seat for deformable annular flow control member 44, which may be made from rubber or an elastomer or any other suitable material. The flow control member 44 is shown as being in the general form of a flat disk having a central opening 45 therein, like that shown in Patent No. 2,454,929, which issued to Leslie A. Kempton on November 30, 1948.

Upon increases in pressure in the hot water entering the valve body through the inlet 11, the water will deform the annular disk 44 in the region of its central orifice 45 into the frusto-conical opening 41 of the seat 39, restricting the orifice of said disk at the upstream side thereof, as shown in Figure 5. This adjusts the flow through the orifice 45 in accordance with variations in pressure and assures a constant flow of hot water to the central mixing chamber 15 through the valve 17.

A cooperating flow control means is provided to adjust the flow rate of water through the flow control annulus 45 in accordance with temperature variations of water in the supply line and provide a mixed water of uniform temperature regardless of variation in temperature and pressure at the sources of supply. Said flow control means includes a bi-metal strip 47, herein shown as being mounted in the hot water inlet 11. A similar oppositely arranged bi-metal strip 48 is mounted in the cold water inlet 12.

The bi-metal strip 47 is mounted in the hot water inlet 11 to flex inwardly upon increases in temperature of the hot water above a predetermined value and to return to its normal unflexed position as the temperature decreases to the desired normal value. The bi-metal thermal strip 47 is herein shown as abutting a shouldered portion 49 of the inlet 11 spaced outwardly from the insert 39. Said thermal strip is floatingly mounted in said inlet for free flexing movement from the position shown in Figure 2 to that shown in Figure 5. A retainer ring or washer 50 is spaced outwardly from the bi-metal strip 47 to retain said strip therein and is suitably seated in an inwardly stepped portion of the inlet 11 and also is abutted by a screen 51 of a type commonly used in fluid mixing valves.

The valve means of the temperature-sensitive flow rate adjusting means is herein shown as being a valve element 52 in the form of a nib projecting inwardly from the bi-metal strip 47. Said nib is secured to the transverse center of the bi-metal strip 47 and its tip is shown as being within the margins of the flow control annulus when said bi-metal element is in the unflexed position shown in Figure 2. The valve element 52 may be of various forms, but is herein shown as being of a generally conical form having a rounded apex positioned within the orifice of the flow control annulus 45 although the apex of said valve element need not be so positioned.

It is obvious from Figures 2 and 5 that as the pressure of the hot water increases, the flow control annulus 44 will flex inwardly toward the downstream side of the inlet within the central conical open portion of the insert 39, to compensate for the increase in pressure in the water and provide a uniform flow of water into the inlet passageway 13 and the valve member 17. If, however, as the pressure of the water increases, the temperature of the water should also increase, the temperature-sensitive flow control means will come into effect and the temperature-responsive bi-metal strip 47 will flex inwardly toward the flow control annulus 44, moving the valve element 52 into the open portion of said annulus to restrict the flow of hot water into the valve, in accordance with the increase in temperature of the water, and thus maintain the temperature of delivered water at substantially the temperature at which the valve is set.

The cold water inlet 12 also has an insert 53 seated therein and carrying a flexible flow control annulus 54, like the annulus 44, to assure the delivery of a constant volume of cold water to the valve 30 and mixing chamber 15, regardless of pressure variations. The bi-metal strip 48 extends across the cold water inlet 12 and abuts a shouldered portion 56 thereof and has a valve element 57 in the form of a nib extending inwardly therefrom. The apex of the valve element 57 is shown as extending within the inner margins of the flexible annulus 48, although it need not be so positioned. The bi-metal element 48 may be like the bi-metal element 47 except it may be reversely positioned to flex inwardly as the temperature of the cold water decreases to decrease the flow rate of the cold water as its temperature decreases and to flex outwardly as the temperature of the water increases to increase the flow rate of the cold water as the temperature approaches the temperature value to which the bi-metal element is set.

It may be seen from the foregoing that a new and improved form of mixing valve has been provided which compensates for variations in pressure of the incoming hot and cold water and assures the mixing of equal volumes of hot and cold water regardless of increases or decreases in pressures in the hot and cold water lines and also adjusts the flow rate of hot and cold water in accordance with the temperature of the water at the source.

It may be further seen that the flow rate of the valve is thus maintained relatively constant regardless of variations in pressure in the hot and cold water inlets and varies only as the temperature in the hot and cold water inlets vary, and this variation is only to an extent sufficient to maintain the delivered temperature of the water substantially uniform, regardless of temperature variations at the inlets.

It will be understood that modifications and variations may be effected without departing from the scope of the novel concepts of the present invention.

I claim as my invention:

1. A fluid control means providing a substantially constant rate of flow regardless of pressure variations of the fluid at the source and adjusting the flow rate in accordance with the temperature of the fluid comprising a conduit, a deformable flow control annulus seated therein and flexing in the direction of flow through said conduit, a member on the upstream side of said annulus at least partially projecting into said annulus, said member being shaped to vary the effective size of the opening in said annulus upon axial movement with respect thereto, and a temperature responsive element carrying said member and moving said member axially with respect to said annulus as the temperature of the fluid varies.

2. A device for maintaining a substantially constant rate of flow regardless of pressure variation and adjusting the rate of flow in accordance with the temperature of the inlet fluid comprising a conduit, a pressure responsive flow control member carried therein, a bi-metal strip within said conduit on the upstream side of said flow control member and a valve element projecting therefrom into cooperating association with said flow control member to adjustably alter the flow rate thereof.

3. A fluid flow control means providing a substantially constant rate of flow regardless of pressure variations of the fluid at the source and adjusting the rate of flow in accordance with the temperature of the fluid comprising a conduit, a deformable annulus seated therein and flexing in the direction of the flow through said conduit, a valve member on the upstream side of said annulus for cooperation with the open portion thereof, and a temperature responsive element carrying said valve member and moving said valve member with respect to said deformable annulus in accordance with the temperature of the inlet fluid.

4. In a device for maintaining a substantially constant rate of flow and for adjusting the rate of flow in accordance with the desired temperature of the inlet water comprising a conduit, a deformable flow control annulus in said conduit, a bi-metal strip mounted in said conduit on the upstream side of said annulus and movable toward said annulus upon variations in temperature from a predetermined normal temperature value, a valve element on said bi-metal strip extending toward said annulus and of increasing cross-sectional area from the outer to the inner end thereof and movable within the open portion of said annulus upon variations in temperature from predetermined normal values.

5. In a device for maintaining a substantially constant rate of flow regardless of pressure variation and adjusting the rate of flow in accordance with the temperature of the inlet fluid comprising an inlet passage, a deformable pressure responsive flow control annulus therein, a bi-metal strip extending across said inlet and floatingly mounted therein to flex toward said annulus upon variations in temperature from a predetermined normal temperature value, a valve element carried by said strip and projecting toward said annulus for movement within the open portion thereof upon variations in temperature from predetermined normal values.

6. In a mixing valve for hot and cold water, a valve body having separate hot and cold water inlets, a central mixing chamber and a discharge outlet leading from said mixing chamber, flow control means for maintaining a substantially constant rate of flow of water through said inlets into said valve body regardless of inlet pressure variation, and means for adjusting the rate of flow in accordance with variations in temperature from predetermined normal values comprising bi-metal strips extending across said inlets and valve elements carried thereby and cooperating with said flow control means to adjustably alter the flow rate thereof.

7. A fluid mixing valve comprising a valve body having separate hot and cold water inlets, a central mixing chamber communicating with said inlets and a discharge outlet therefrom, flow control means in said inlets comprising a resilient flow control annulus seated therein for maintaining a substantially constant rate of flow of the water through said inlets regardless of variations in inlet pressures, temperature sensitive members floatingly mounted in said inlets and having valve members associated therewith for cooperation with an associated flow control annulus and adjusting the rate of flow therethrough in accordance with the temperatures of the inlet water.

8. In a fluid mixing valve for hot and cold water, a valve body having separate hot and cold water inlets, a central mixing chamber and a common outlet therefrom, and flow control means in said inlets compensating for variation in temperatures and pressures in the inlet water comprising a resilient annulus in each of said inlets and flexing in the direction of flow of the water, a bi-metal temperature sensitive member seated in each of said inlets on the upstream sides of the associated annulus and mounted to flex toward said annulus upon variations in temperature from predetermined normal temperatures and having projecting valve elements carried thereby, movable within the opening of the associated annulus, to adjust the rate of flow therethrough upon variations of inlet temperatures from predetermined normal values.

9. In a fluid mixing valve for hot and cold water, a valve body having separate hot and cold water inlets, a central mixing chamber communicating therewith and a common discharge outlet leading therefrom, a deformable annulus seated in each of said inlets and flexing in the direction of flow thereinto in accordance with the pressure of the water entering said inlets, and a cooperating flow restricting member operating within the open portion of each annulus and varying the opening therethrough for adjusting the flow rate setting afforded by said annulus, and means for moving said members in accordance with temperature variations of the inlet water.

10. In a mixing valve for hot and cold water, a valve body having separate hot and cold water inlets, a central mixing chamber, valve means selectively operable to control the passage of hot and cold water from said inlets into said mixing chamber, a common discharge outlet from said mixing chamber, a deformable annulus seated in each of said inlets and flexing in the direction of the flow of the water thereinto for delivering a substantially constant rate of flow of water to said valve means regardless of variations in pressure of the inlet water, a bi-metal strip extending across each of said inlets on the upstream sides of said flow control means, a valve element extending from each of said inlets on the upstream sides of said flow control means, a valve element extending from each of said bi-metal strips in alignment with the open portion of an associated annulus and movable therein upon variations in temperature of the inlet water from predetermined normal temperature values, for adjusting the rate of flow in accordance with the temperature of the inlet water.

11. A fluid mixing valve comprising a valve body having separate inlets for hot and cold fluid, a central mixing chamber communicating therewith and a common discharge outlet therefrom, flow control means in said inlets comprising a deformable annulus in each of said inlets, flexing in the direction of flow of water thereinto, and cooperating valve elements floatingly mounted in said inlets to adjust the rate of flow therethrough in accordance with the temperature variations from a predetermined normal temperature value, comprising oppositely arranged bi-metal strips seated in said hot and cold water inlets and flexing toward an associated annulus upon variations of temperature of the inlet water from predetermined normal temperature values.

References Cited in the file of this patent

UNITED STATES PATENTS

| | | |
|---|---|---|
| 1,807,040 | Leonard | May 26, 1931 |
| 1,972,170 | Spencer | Sept. 4, 1934 |
| 1,996,330 | Goshaw | Apr. 2, 1935 |
| 2,453,409 | Chace | Nov. 9, 1948 |
| 2,528,423 | Chace | Oct. 31, 1950 |
| 2,584,420 | Branson | Feb. 5, 1952 |
| 2,644,476 | Smith | July 7, 1953 |

FOREIGN PATENTS

| | | |
|---|---|---|
| 135,591 | Austria | Nov. 25, 1933 |